US008038224B2

(12) United States Patent
Trentin et al.

(10) Patent No.: US 8,038,224 B2
(45) Date of Patent: Oct. 18, 2011

(54) MOTOR-VEHICLE WHEEL STRUCTURE HAVING A MAIN DISK AND AN AUXILIARY DISK

(75) Inventors: Marcello Trentin, Orbassano (IT); Davide Vigé, Orbassano (IT); Benedetta Peyron, Orbassano (IT); Giovanni Boreanaz, Orbassano (IT); Giovanni Monfrino, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 163 days.

(21) Appl. No.: 12/547,925

(22) Filed: Aug. 26, 2009

(65) Prior Publication Data
US 2010/0127557 A1 May 27, 2010

(30) Foreign Application Priority Data

Nov. 24, 2008 (EP) .................................. 08425747

(51) Int. Cl.
 *B60B 3/08* (2006.01)
(52) U.S. Cl. .......... 301/63.108; 301/63.101; 301/64.302
(58) Field of Classification Search ............ 301/63.101, 301/63.107, 63.108, 64.201, 64.301, 64.302, 301/64.306, 64.701, 64.702, 64.706, 64.303, 301/64.304, 64.307, 37.43
See application file for complete search history.

(56) References Cited

U.S. PATENT DOCUMENTS

| 1,380,925 | A | * | 6/1921 | Putnam | 301/63.108 |
| 1,399,410 | A | * | 12/1921 | Stafford | 301/63.109 |
| 1,745,973 | A | * | 2/1930 | Bellamore | 301/64.302 |
| 2,257,684 | A | * | 9/1941 | Hecht | 301/63.109 |
| 3,767,267 | A | | 10/1973 | Clement | |
| 4,511,183 | A | * | 4/1985 | Spiegel et al. | 301/37.372 |
| 4,645,267 | A | * | 2/1987 | Weld | 301/64.301 |
| 4,659,148 | A | * | 4/1987 | Grill | 301/37.26 |
| 5,188,429 | A | * | 2/1993 | Heck et al. | 301/64.307 |
| 6,024,415 | A | * | 2/2000 | Stach | 301/64.102 |

FOREIGN PATENT DOCUMENTS

| DE | 40 27 355 | 3/1991 |
| DE | 196 01 778 | 4/1997 |
| DE | 101 30 450 | 1/2003 |
| FR | 845949 | 9/1939 |
| GB | 453876 | 9/1936 |

OTHER PUBLICATIONS

European Search Report for EP Application No. 08425747, dated Apr. 29, 2009.

* cited by examiner

*Primary Examiner* — Russell Stormer
(74) *Attorney, Agent, or Firm* — Nixon & Vanderhye P.C.

(57) ABSTRACT

A motor-vehicle wheel structure comprises a wheel rim and a wheel disk having a circumferential border bent and welded within the rim, and a central portion bearing a circumferential series of holes for engagement of bolts for fixing the wheel to the wheel support. The central portion is connected to the circumferential border of the disk by an intermediate annular portion having in cross section an arched configuration projecting outwards. Welded on the outer face of the wheel disk is an auxiliary disk having a substantially plane conformation, the outer border of which is welded to the main disk substantially in a position corresponding to the apex of the aforesaid projecting annular portion. The auxiliary disk integrates tubular columns that project from the inner face of the auxiliary disk and have their ends welded to the central portion of the main disk so that they are co-axial to the holes for the fixing bolts.

6 Claims, 8 Drawing Sheets

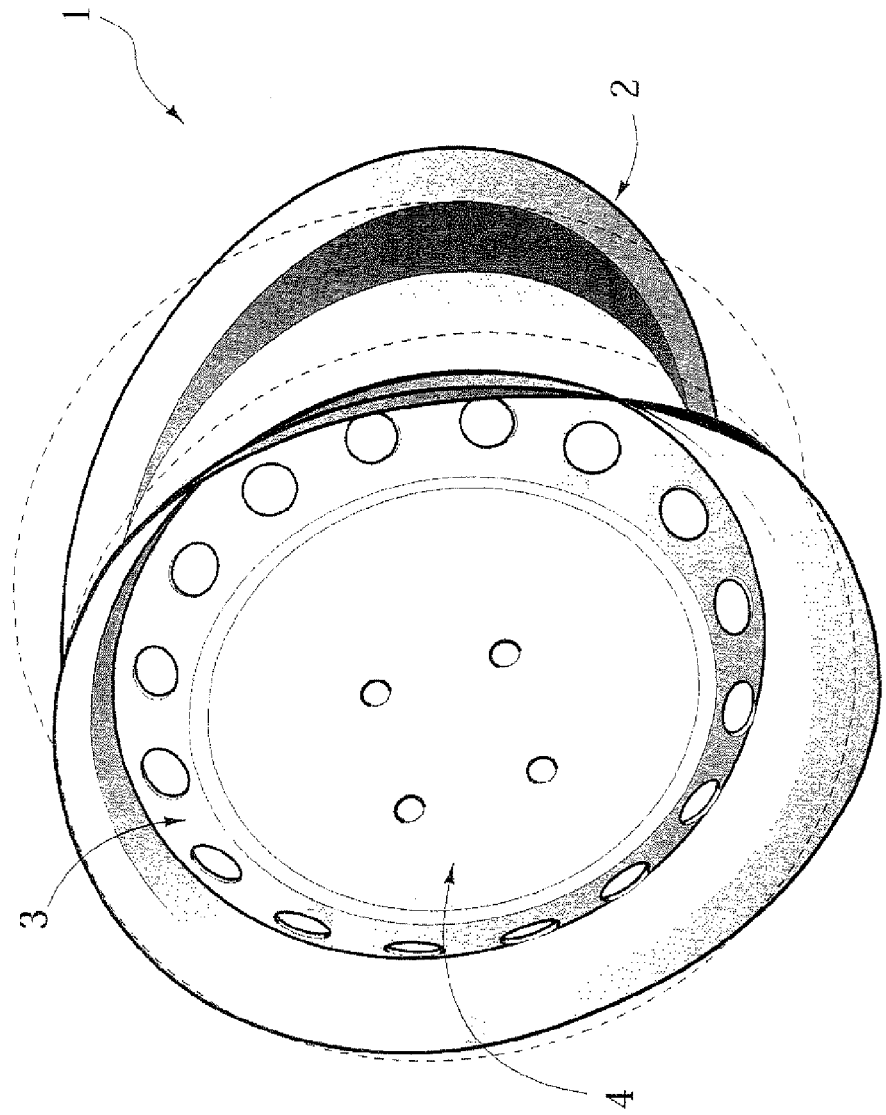

MOTOR-VEHICLE WHEEL STRUCTURE HAVING A MAIN DISK AND AN AUXILIARY DISK

BACKGROUND OF THE INVENTION

The present invention relates to the metal structures of a motor-vehicle wheel, of the type comprising a wheel rim and a wheel disk having a circumferential border bent and welded within the rim, the disk moreover having a central portion with a circumferential series of holes for engagement of bolts for fixing the wheel to a wheel support, said central portion of the wheel disk being radiused with the aforesaid outer circumferential border by an intermediate annular portion of the wheel disk having, in cross section, an arched conformation, projecting outwards.

The problem underlying the present invention is that of providing a wheel structure that will be able to reduce to the minimum the deformations and vibrations to which the wheel is subject as it rolls on the ground, with consequent reduction of the level of noise that is perceived inside the passenger compartment of a motor vehicle.

Studies and experiments conducted by the present applicant have shown that an increase of the static and dynamic stiffness of the structure of the wheel can contribute considerably to the acoustic comfort inside the passenger compartment of the motor vehicle. From this standpoint, wheels made of light alloy in general enable an optimal result to be obtained, since they are considerably stiffer than wheels made of steel plate, but present the drawback of a relatively high cost.

SUMMARY OF THE INVENTION

The object of the present invention is to provide a wheel structure having improved characteristics from the standpoint of static and dynamic stiffness, which will enable, for example, production of a wheel made of steel plate with characteristics of stiffness similar to those of a conventional wheel made of light alloy, or else that will enable production of a wheel made of light alloy with characteristics of stiffness even superior to those of wheels made of light alloy of a conventional type.

In general, the object of the invention is to provide a wheel characterized by a high static and dynamic stiffness and such as to reduce to the minimum the noise due to the deformations and vibrations resulting from rolling on the ground, as the motor vehicle is travelling.

A further object of the invention is to achieve the aforesaid target with a relatively simple and inexpensive structure.

With a view to achieving the above purposes, the subject of the invention is a motor-vehicle wheel structure having all the characteristics that have been referred to at the start of the present description and being moreover characterized in that welded on the outer face of the aforesaid wheel disk is an auxiliary disk having a substantially plane conformation, the outer border of which is welded to the main disk substantially in a position corresponding to the apex of the aforesaid projecting annular portion in such a way as to extend parallel to and at a distance from the central portion of the main disk, said auxiliary disk integrating tubular columns projecting from the inner face of the auxiliary disk and having their ends welded to the central portion of the main disk so that they are co-axial to respective holes for the fixing bolts.

The invention is characterized in particular in that the auxiliary disk is welded on the outer side of the main disk and extends parallel to and at a distance from the central portion of the main disk so as to define therewith a closed structure that is relatively stiff in regard to the deformations to which the wheel is subject during use. The stiffness of the structure is further increased by the provision of the aforesaid tubular columns co-axial to the holes for the fixing bolts, which extend between the auxiliary disk and the central portion of the main disk and have their opposite ends welded to said elements.

In a preferred embodiment, the wheel rim, the main disk, and the auxiliary disk are all made of steel plate. The wheel structure thus obtained, albeit made of steel plate, presents characteristics of stiffness comparable to those of a conventional wheel made of light alloy. Application of the invention also to a structure made of light alloy is not in any case excluded.

Tests conducted by the present applicant have shown that the wheel structure according to the invention enables a considerable increase in the static and dynamic stiffness of the wheel to be obtained, and a consequent considerable reduction of the noise in the passenger compartment of the motor vehicle when the latter is travelling. The auxiliary disk provided according to the invention on the outer side of the main disk also performs the secondary function of aesthetic element and can for this purpose have an external surface shaped and/or decorated in various ways.

BRIEF DESCRIPTION OF THE DRAWINGS

Further characteristics and advantages of the invention will emerge from the ensuing description with reference to the annexed drawings, which are provided purely by way of non-limiting example and in which:

FIGS. 6, 7, and 8 are, respectively, a cross-sectional view, a side view, and a perspective view that show the deformations to which the wheel structure according to the invention is subject as it rolls, said deformations being exaggerated for reasons of clarity.

DETAILED DESCRIPTION OF INVENTION

Figure 1:
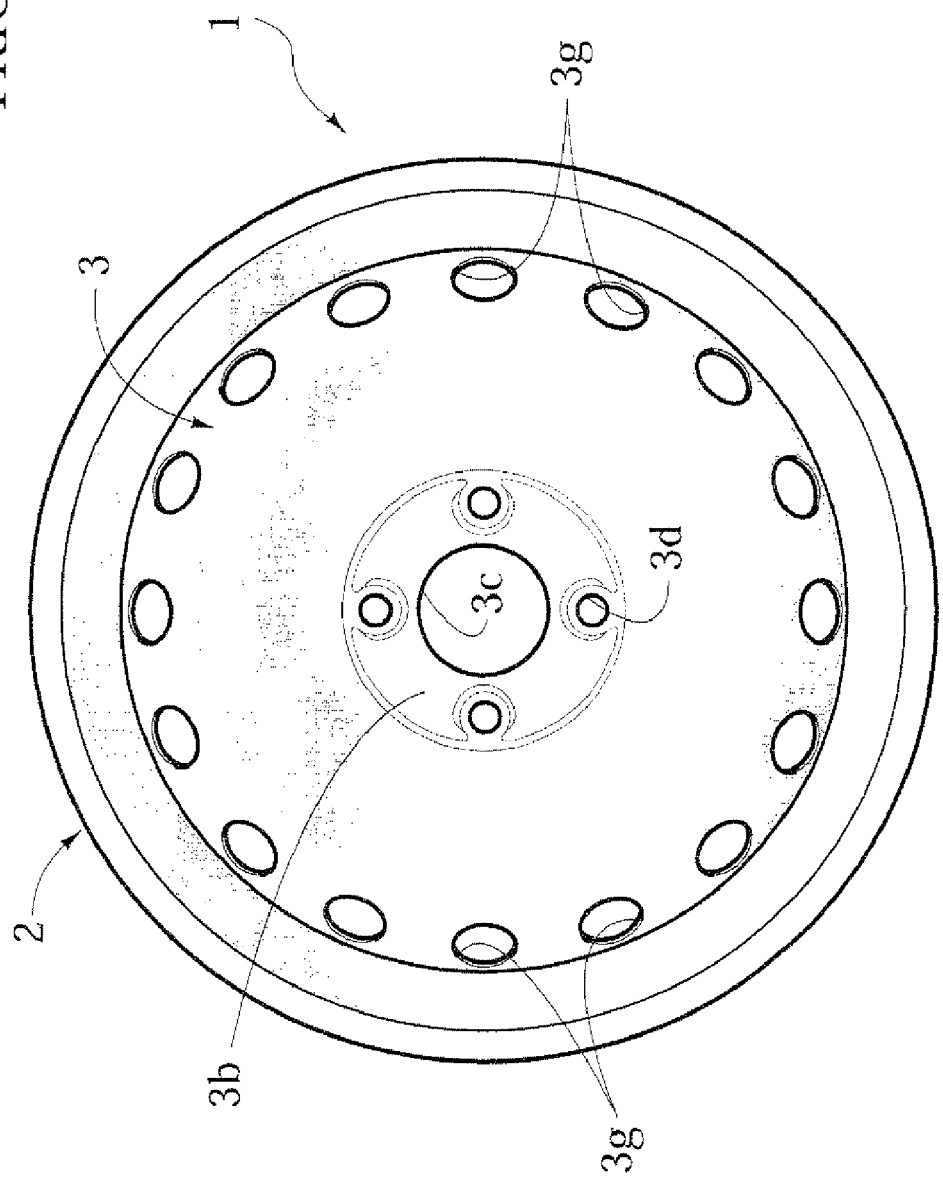
FIG. 1 is a front view of a wheel structure made of steel plate of a traditional type, without the auxiliary disk provided according to the invention.
Figure 2:
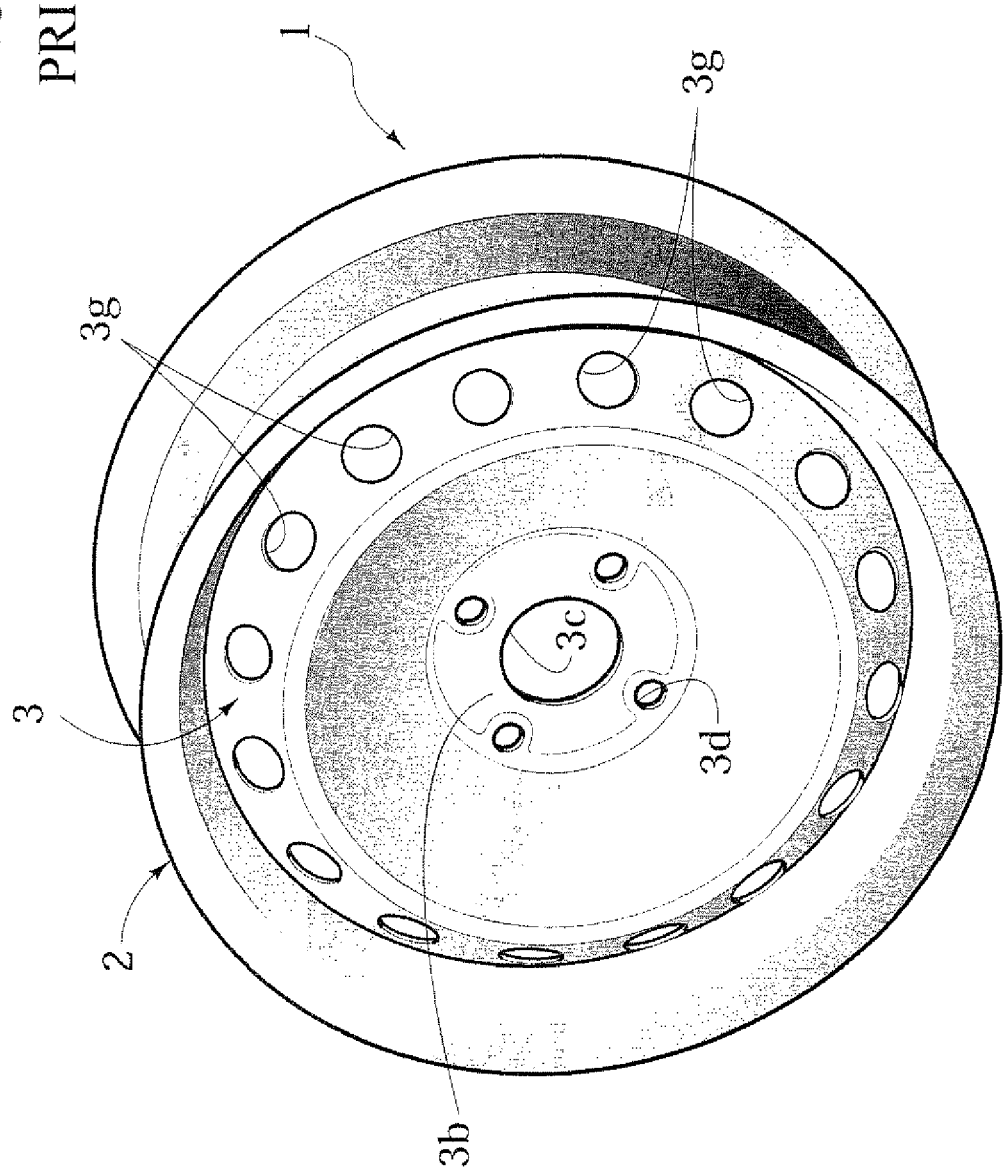
FIG. 2 is a perspective view of the wheel structure of FIG. 1.
Figure 3:
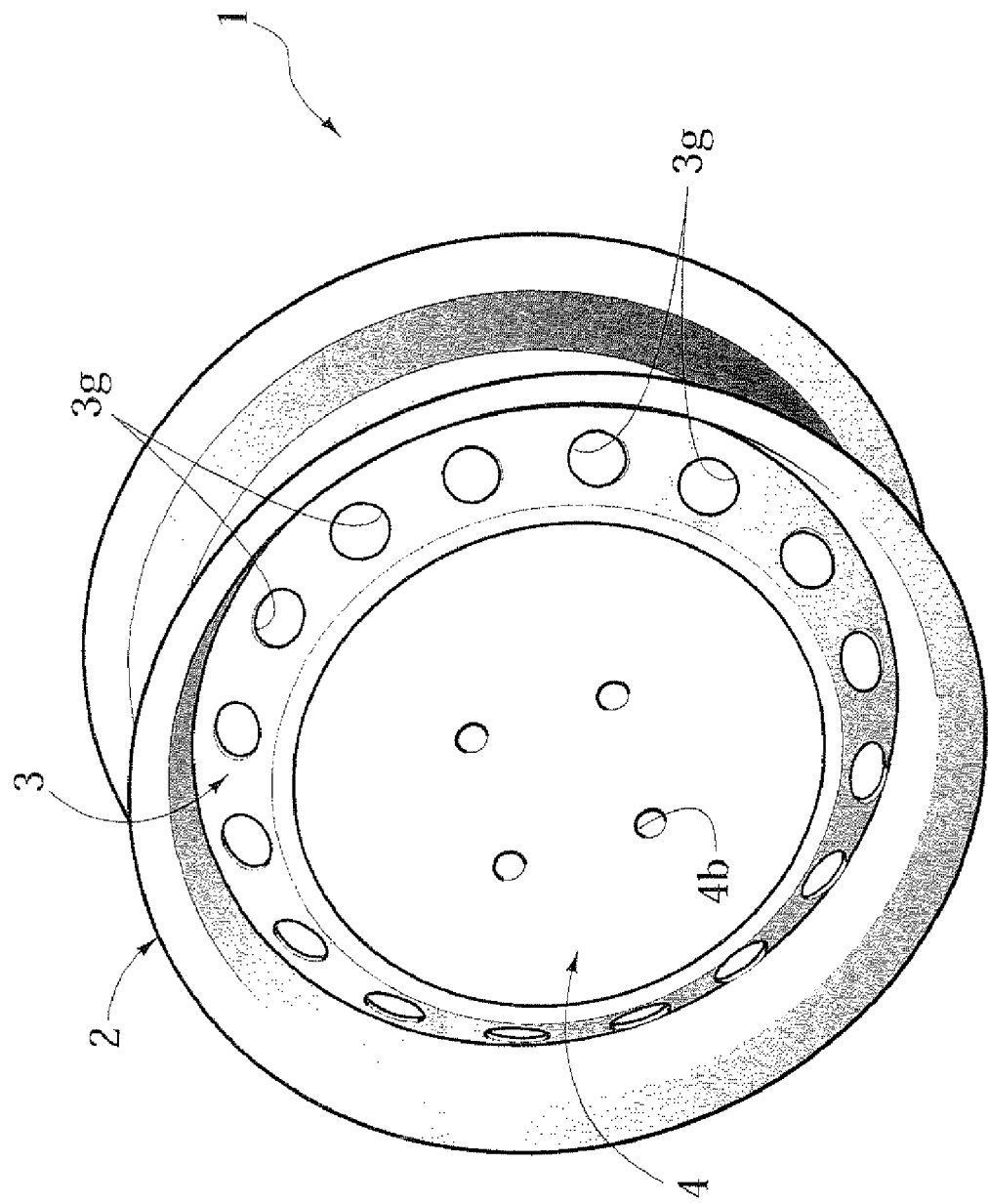
FIG. 3 is a perspective view of a preferred embodiment of the wheel structure according to the invention, where said structure is made of steel plate.
Figure 4:
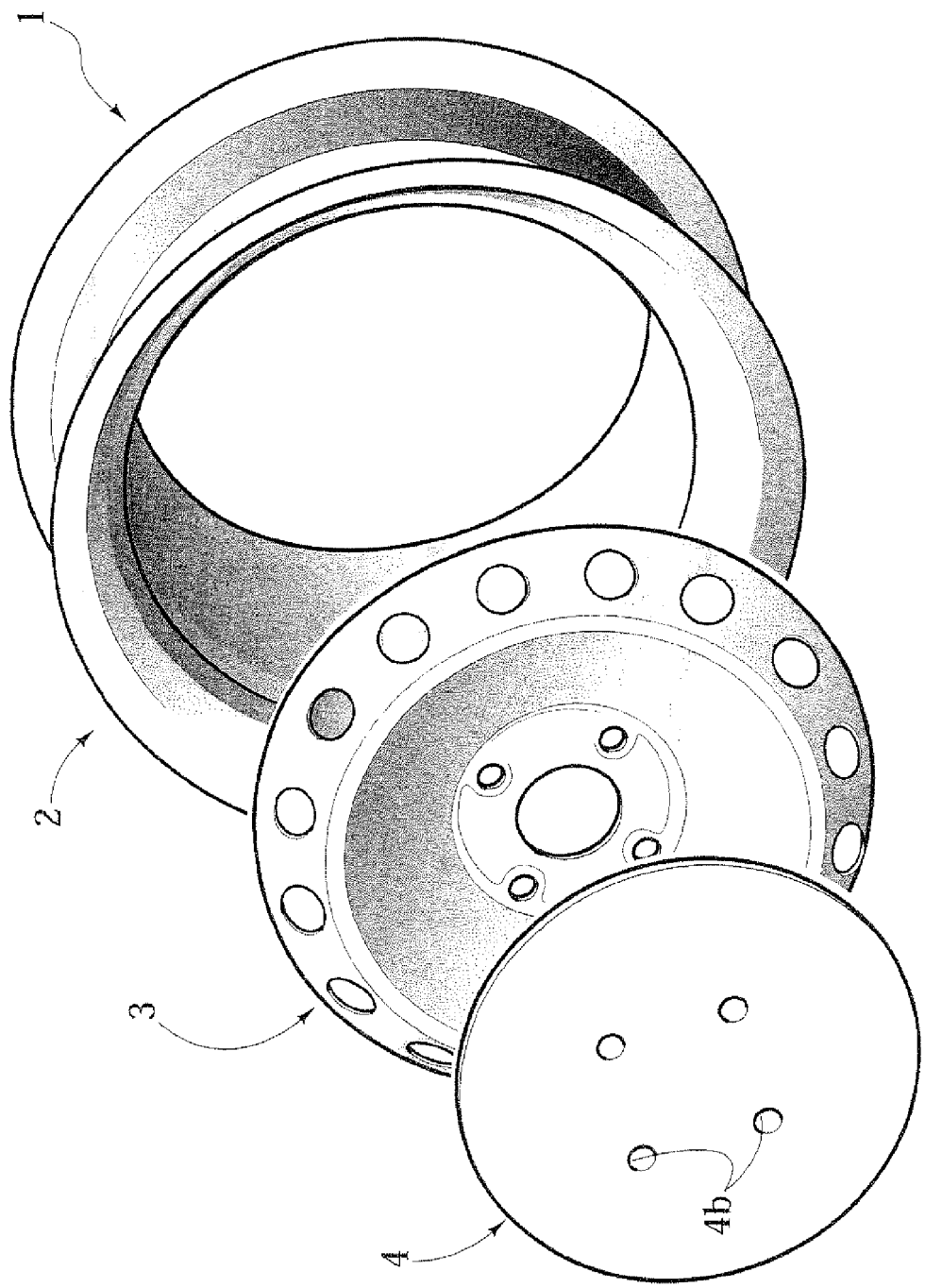
FIG. 4 is an exploded perspective view of the wheel structure of FIG. 3.
Figure 5:
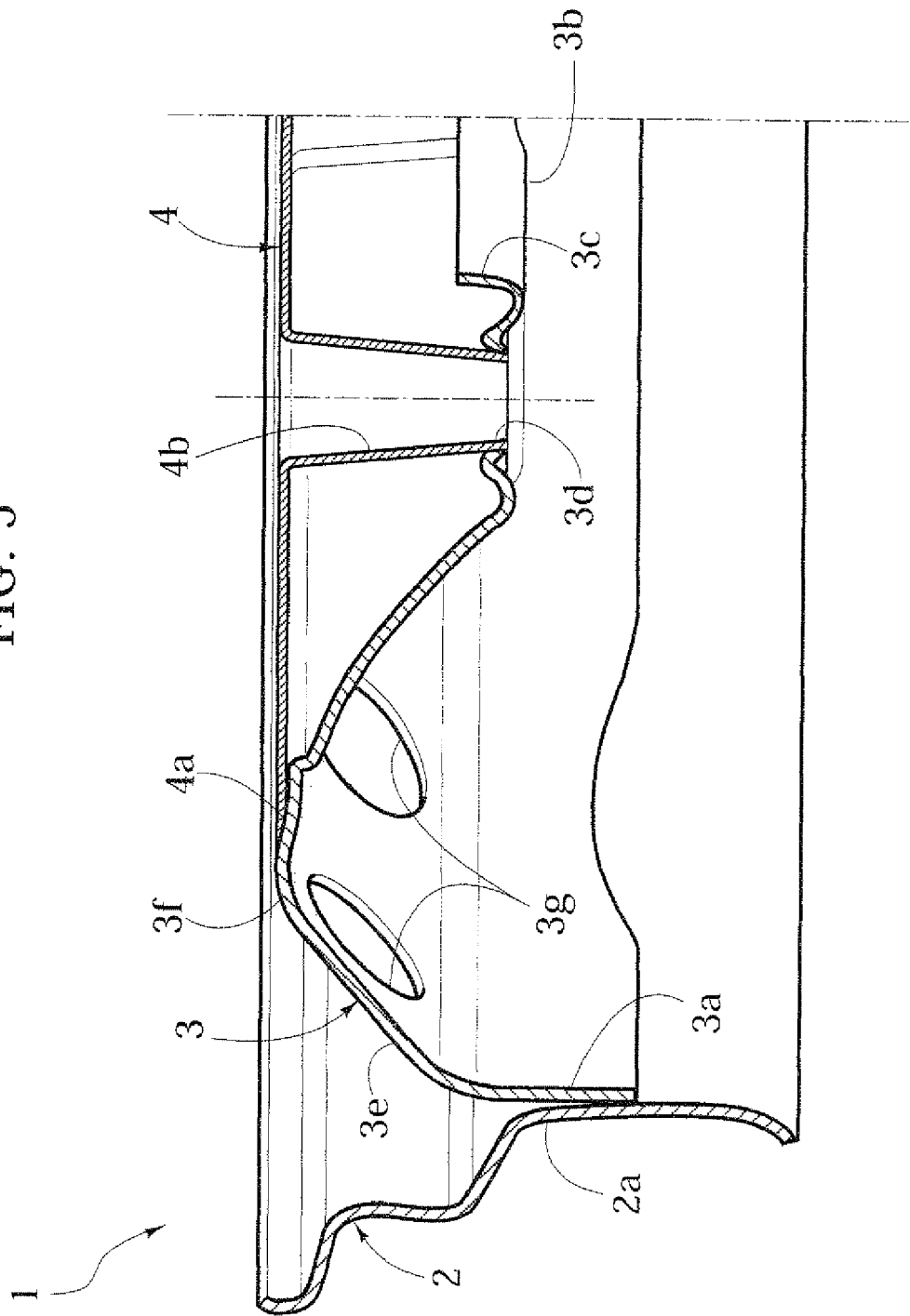
FIG. 5 is a cross-sectional view at an enlarged scale of the wheel structure of FIGS. 3 and 4 in a plane containing the axis of the wheel.

With reference to the drawings, both in the case of the conventional wheel of FIGS. 1 and 2 and in the case of the wheel according to the invention of FIGS. 3-5, the reference number 1 designates as a whole the motor-vehicle wheel structure, comprising a wheel rim 2 made of stamped steel plate and a main wheel disk 3.

As may be seen in FIG. 5 for the wheel according to the invention, but also in the case of the conventional wheel of FIGS. 1 and 2, the main disk 3 has a outer circumferential border 3a bent so as to define a cylindrical wall welded within an intermediate cylindrical wall 2a of the rim 2.

The main wheel disk 3 moreover presents, both in the case of the invention and in the conventional case, a central portion 3b having a central hub 3c for mounting on the corresponding part of a wheel support, and a plurality of holes 3d for engagement of bolts for fixing the wheel to the wheel support.

Once again with reference to the main wheel disk 3, both in the case of the invention (see in particular FIG. 5) and in the conventional case, the central portion 3b of the disk 3 is radiused with the outer circumferential border 3a by means of an intermediate annular portion 3e, which in the cross section illustrated in FIG. 2 presents an arched profile, projecting outwards so as to have its apex 3f substantially tangential to the outer end plane of the rim 2. The aforesaid intermediate annular portion 3e moreover preferably has a plurality of openings 3g, which, in the example illustrated, have a circular shape, but may of course have any different shape and/or arrangement.

According to the invention, welded on the outer face of the main disk 3 is an auxiliary disk 4 (see FIGS. 3-5), also made of steel plate, presenting a substantially plane conformation and having its outer border 4a welded to the projecting portion 3e of the main disk 3, substantially adjacent to its apex 3f. As a result of said arrangement, the auxiliary disk 4 hence extends parallel to and at a distance from the central portion 3b of the main disk 3.

The auxiliary disk 4 moreover integrates a plurality of tubular columns 4b, which, in the example illustrated, have a conical conformation tapering in the direction of the central portion 3b. Each tubular column 4b extends co-axial to a respective hole 3d made in the main disk 3 and has its end opposite to the disk 4 that is welded to the central portion 3b of the main disk 3. In this way, the columns 4b are able to stiffen considerably the box structure defined between the parallel and facing walls of the central portion 3b of the main disk 3 and the auxiliary disk 4.

Figure 7:
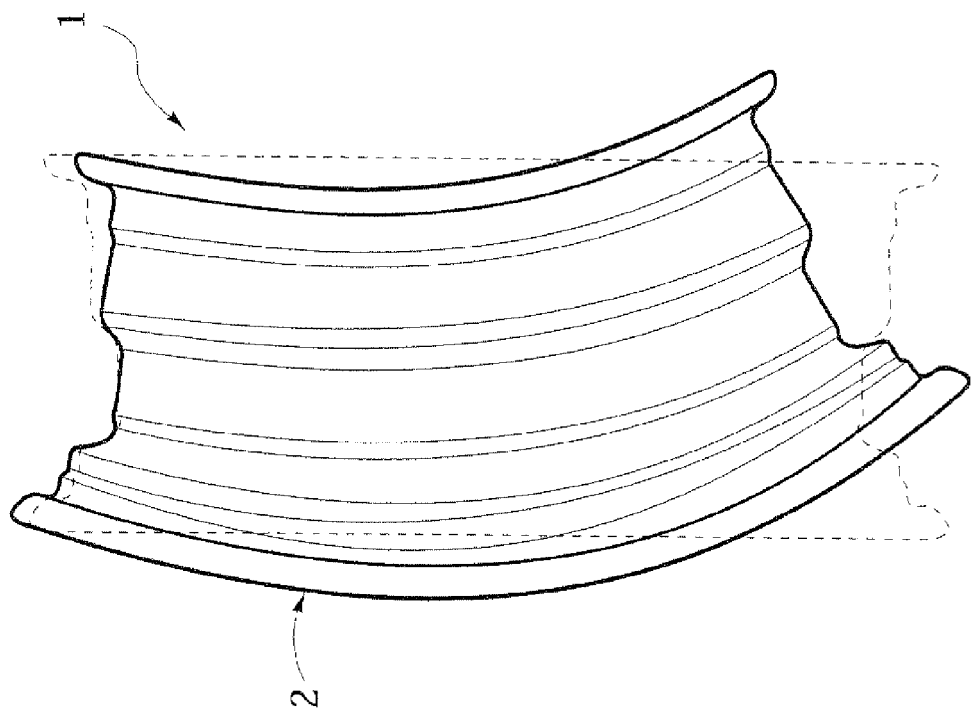
Figure 6:
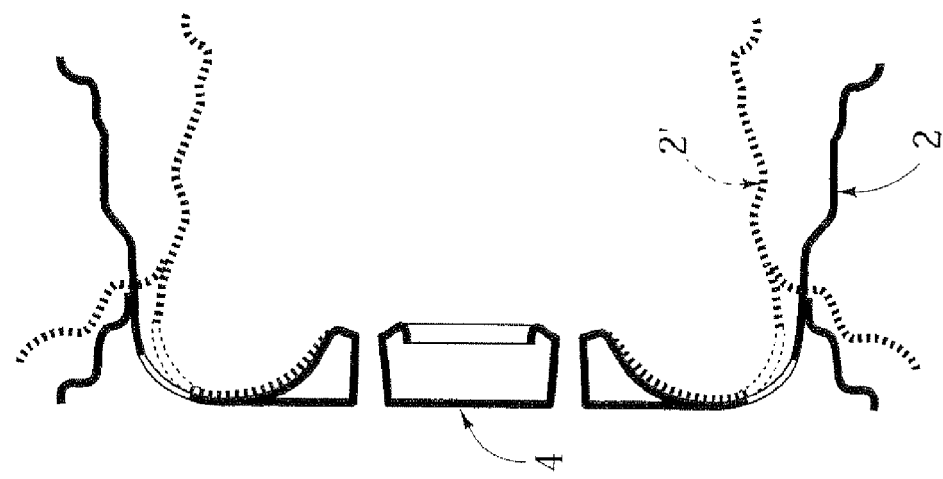
Figure 9:
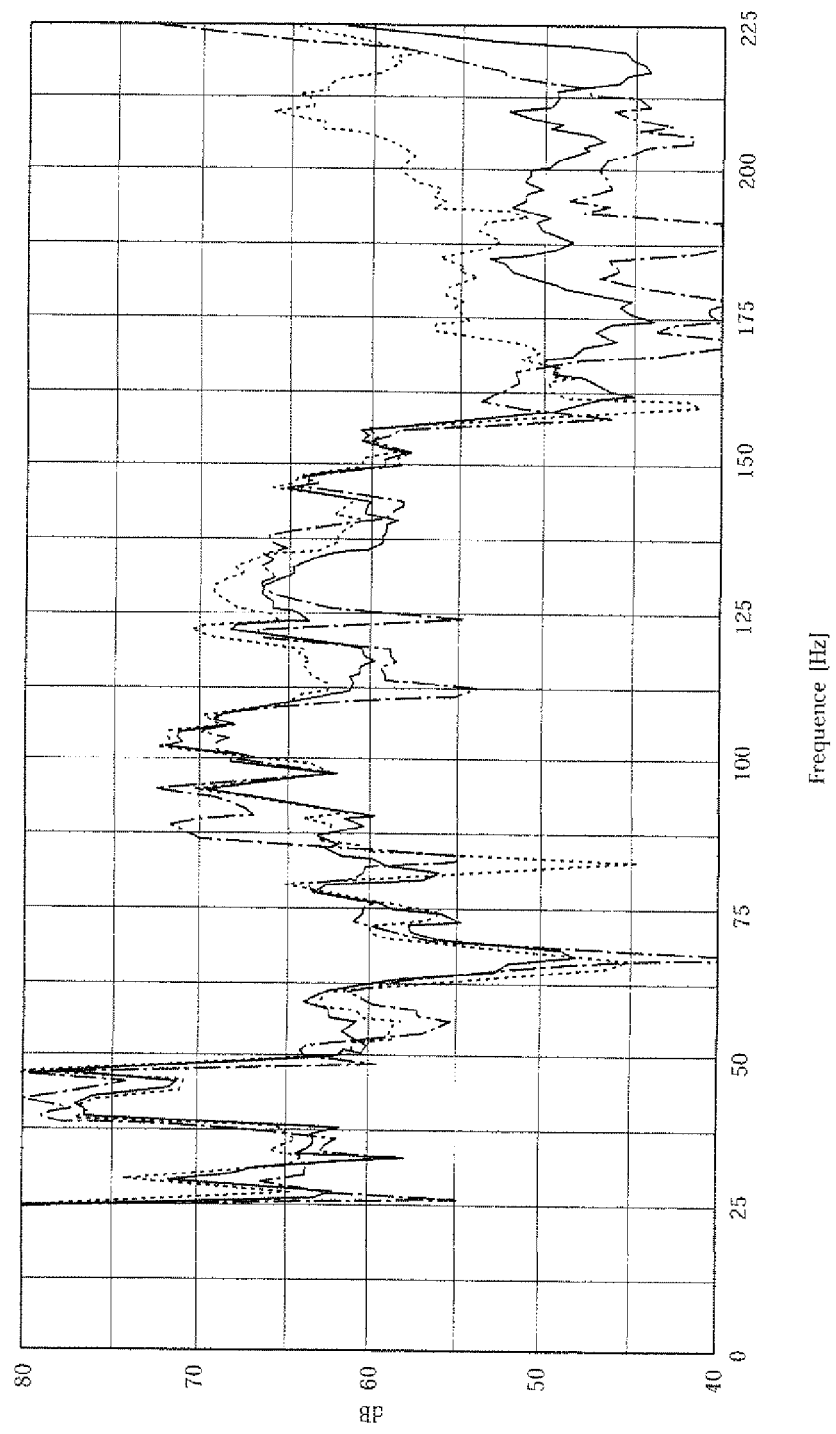
FIG. 9 is a diagram that enables a comparison of the characteristics of noise of the wheel structure according to the invention with a wheel structure made of steel of the conventional type illustrated in FIG. 1, and with a wheel structure made of light alloy.

FIGS. 6-8 of the annexed drawings show, exaggerated for reasons of clarity, the deformations to which the wheel structure according to the invention is subject during use. The studies and tests conducted by the present applicant have shown that said deformations are considerably smaller than those to which a wheel structure made of steel of the type of FIGS. 1 and 2, without the auxiliary disk 4, is subject and that they are substantially similar or in any case close to those to which a wheel structure without the disk 4 but made of light alloy would be subject. Said result is highlighted in the diagram of FIG. 9, which has been obtained by measuring the noise in the passenger compartment of the motor vehicle when it is travelling. The diagram shows the variation of the noise at the different frequencies for the wheel according to the invention (solid line), for a wheel made of steel of the conventional type illustrated in FIGS. 1 and 2 (dashed line), and for a wheel without the disk 4 but made of light alloy (dashed and dotted line). The diagram brings out clearly the considerable noise reduction that can be obtained in a wheel made of steel thanks to the adoption of the characteristics that form the subject of the present invention, particularly in certain frequency ranges. The diagram moreover shows how the noise of the wheel according to the invention is comparable to that of a wheel made of light alloy.

The outer face of the auxiliary disk 4 can be configured and/or decorated and/or painted to bestow a given aesthetic pattern on the wheel structure.

Of course, without prejudice to the principle of the invention, the details of construction and the embodiments may vary widely with respect to what is described and illustrated herein purely by way of example, without thereby departing from the scope of the present invention.

In particular, even though the invention has been illustrated with reference to an embodiment that envisages that the structure of the wheel is made of steel plate, by no means ruled out is the possibility of re-applying the concepts of the invention also to a wheel made of light alloy in order to increase the stiffness thereof as compared to the traditional configuration.

What is claimed is:

1. A motor-vehicle wheel structure, comprising a wheel rim and a wheel disk having an outer circumferential border, which is bent and welded within the rim, said disk having a central portion with a circumferential series of holes for engagement of bolts for fixing the wheel to a wheel support, said central portion of the wheel disk being radiused to the aforesaid outer circumferential border by an intermediate projecting annular portion of the wheel disk having in cross section an arched conformation projecting outwards, wherein welded on an outer face of said wheel disk is an auxiliary disk having a substantially planar conformation, an outer border of which is welded to the main disk substantially in a position corresponding to the apex of the aforesaid projecting annular portion in such a way as to extend parallel to and at a distance from the central portion of the main disk, said auxiliary disk integrating tubular columns projecting from the inner face of the auxiliary disk and welded to the central portion of the main disk so that they are co-axial to the aforesaid holes for the fixing bolts.

2. The wheel structure according to claim 1, wherein said intermediate annular portion of the main disk has a plurality of openings set at the same angular distance apart from one another.

3. The wheel structure according to claim 1, wherein said tubular columns are conical and tapered in the direction of the central portion of the main disk.

4. The wheel structure according to claim 1, wherein the outer face of said auxiliary disk is configured and/or decorated and/or painted to bestow a given aesthetic pattern on the wheel structure.

5. The wheel structure according to claim 1, wherein the rim, the main disk, and the auxiliary disk are all made of steel plate.

6. The wheel structure according to claim 1, wherein the rim, the main disk, and the auxiliary disk are all made of light alloy.

* * * * *